(12) United States Patent
Kanematsu

(10) Patent No.: US 7,587,928 B2
(45) Date of Patent: Sep. 15, 2009

(54) LEAK INSPECTION DEVICE

(75) Inventor: Yoshikuni Kanematsu, Takahama (JP)

(73) Assignee: Denso Corporation, Kariya (JP)

( * ) Notice: Subject to any disclaimer, the term of this patent is extended or adjusted under 35 U.S.C. 154(b) by 373 days.

(21) Appl. No.: 11/600,253

(22) Filed: Nov. 15, 2006

(65) Prior Publication Data
US 2007/0113621 A1 May 24, 2007

(30) Foreign Application Priority Data
Nov. 24, 2005 (JP) .............................. 2005-338987

(51) Int. Cl.
*G01M 3/04* (2006.01)
(52) U.S. Cl. ...................................... 73/40.7
(58) Field of Classification Search .................... 73/40.7
See application file for complete search history.

(56) References Cited

U.S. PATENT DOCUMENTS

| | | | | |
|---|---|---|---|---|
| 3,762,212 A | * | 10/1973 | Morley et al. ................. | 73/40.7 |
| 5,172,583 A | * | 12/1992 | Tallon ........................ | 73/40.7 |
| 5,361,626 A | * | 11/1994 | Colligan et al. .............. | 73/40.7 |
| 5,369,983 A | * | 12/1994 | Grenfell ..................... | 73/40.7 |
| 6,729,177 B2 | | 5/2004 | Shioya et al. | |
| 2007/0157704 A1 | * | 7/2007 | Jenneus et al. ............... | 73/40.7 |

FOREIGN PATENT DOCUMENTS

| | | |
|---|---|---|
| JP | 2003-240670 | 8/2003 |
| JP | 2005-114611 | 4/2005 |
| JP | 2005-121481 | 5/2005 |

* cited by examiner

*Primary Examiner*—Hezron Williams
*Assistant Examiner*—Rodney T Frank
(74) *Attorney, Agent, or Firm*—Harness, Dickey & Pierce, PLC

(57) ABSTRACT

A leak inspection device comprises: a vacuum chamber 2 for accommodating a product 1; a vacuum pump 3 for discharging air from the vacuum chamber; a He gas bomb 4 for supplying and charging He gas into the product; and a leak detector 5 for detecting He gas which has leaked out from the product, wherein a heater 8 is provided on an outer wall of the vacuum chamber and an inner surface temperature of the vacuum chamber is maintained to be higher than the temperature of the outside air. Due to the above constitution, moisture contained in the atmosphere is not attached onto the inner surface of the vacuum chamber.

5 Claims, 4 Drawing Sheets

LEAK INSPECTION DEVICE

BACKGROUND OF THE INVENTION

1. Field of the Invention

The present invention relates to a leak inspection device in which air leakage from an object to be inspected is inspected with a leakage inspection medium (tracer gas) such as helium gas (He gas).

2. Description of the Related Art

Concerning prior art inspection methods to inspect a minute airtightness leak from an object to be inspected, an inspection method has been provided in which a helium gas leak detector to detect a volume of tracer gas (He gas), which has leaked out from an object to be detected, is used. An example of this inspection method is a vacuum type helium gas leak inspection method in which a vacuum chamber is used.

In the leak inspection device in which the vacuum chamber is used, an inspection is made according to the inspection flow shown in FIG. 2, which will be described as follows. A product, which is an object to be inspected, is accommodated in a vacuum chamber, and a pipe for charging He gas is connected to the product. Next, a vacuum pump is operated so as to discharge air from the vacuum chamber. When the degree of vacuum in the vacuum chamber has reached a predetermined value, for example, when the degree of vacuum in the vacuum chamber has reached 10 Pa, the vacuum pump is stopped so as to stop an air discharging operation and the product is filled with He gas supplied from a helium supply source. At this time, He gas is supplied until the pressure of He gas in the product is raised to about 1 MPa. Next, He gas, which has leaked out from the product into the vacuum chamber, is introduced into a leak detector and a volume of the leakage gas is measured by utilizing a mass spectrometry method. According to the result of the measurement, the quality of the product 1 is judged.

As described above, when the He gas leak inspection is made, the product is put into the vacuum chamber so as to make the inspection. However, in this case, in order to take the product in and out, the inner pressure of the vacuum chamber must be returned to the atmospheric pressure each time the product is taken in and out. At the time of returning the inner pressure of the vacuum chamber to the atmospheric pressure, as moisture is contained in the outside air introduced into the vacuum chamber, an inner wall temperature of the vacuum chamber is decreased by the adiabatic expansion caused by decompression. Therefore, the moisture contained in the outside air attaches to a surface of the inner wall of the vacuum chamber. Further, as the outside air enters the vacuum chamber at the time of taking the product in and out the vacuum chamber, the moisture contained in the outside air attaches onto the inner wall face.

After that, when air is sucked out from the vacuum chamber by the action of a vacuum pump so as to conduct a test on the product, the above attached water is evaporated again. As a result, it takes a long time to discharge air from the vacuum chamber. Further, the thus mixed water particles affect the mass spectrometry made by the leak detector, that is, the background of the measurement is raised, which deteriorates the measurement sensitivity.

SUMMARY OF THE INVENTION

The present invention has been accomplished to solve the above problems. An object of the present invention is to provide a leak inspection device characterized in that: the water contained in the atmosphere is prevented from attaching onto the inner surface of the vacuum chamber so that the discharging time of discharging air from the vacuum chamber can be reduced and stabilized; and the background generated by the water is reduced so that the measurement sensitivity can be enhanced and the measurement can be made with high accuracy and the reliability of the measurement can be enhanced.

A leak inspection device of the present invention comprises: a vacuum chamber for accommodating an object to be inspected; a vacuum pump for discharging air from the vacuum chamber; a tracer gas supply source for supplying and charging tracer gas into the object to be inspected; and a leak detector for detecting tracer gas which has leaked out from the object to be inspected, wherein the tracer gas is pressurized and charged into the object to be inspected, which is accommodated in the vacuum chamber, so as to detect leakage of the tracer gas from the object to be inspected. A heater is provided on an outer wall of the vacuum chamber and an inner surface temperature of the vacuum chamber is maintained to be higher than a temperature of the outside air. Due to the foregoing, at the time of taking the object to be inspected into the vacuum chamber and taking the object to be inspected out from the vacuum chamber or at the time of discharging air from the vacuum chamber, it is possible to prevent the water contained in the atmosphere from attaching onto the inner surface of the vacuum chamber. Accordingly, the vacuum discharging time can be shortened and stabilized. Further, it is possible to reduce the background generated by the water. Therefore, the measurement sensitivity can be enhanced, and the measurement can be made with high accuracy. Furthermore, the reliability of the inspection can be enhanced.

According to the leak inspection device of the present invention, the inner surface temperature of the vacuum chamber is maintained to be higher than the outside air temperature by 10° C. or more and to be not more than 60° C. Therefore, the surface temperature of the vacuum chamber can be prevented from becoming excessively high.

According to the leak inspection device of the present invention, the heater is covered with heat insulating material. Therefore, energy can be saved.

According to the leak inspection device of the present invention, the heater is an electric heater.

According to the leak inspection device of the present invention, the heater is a hot water heater or a hot air heater.

The present invention may be more fully understood from the description of the preferred embodiments of the invention, as set forth below, together with the accompanying drawings.

DESCRIPTION OF THE PREFERRED EMBODIMENTS

Figure 1:
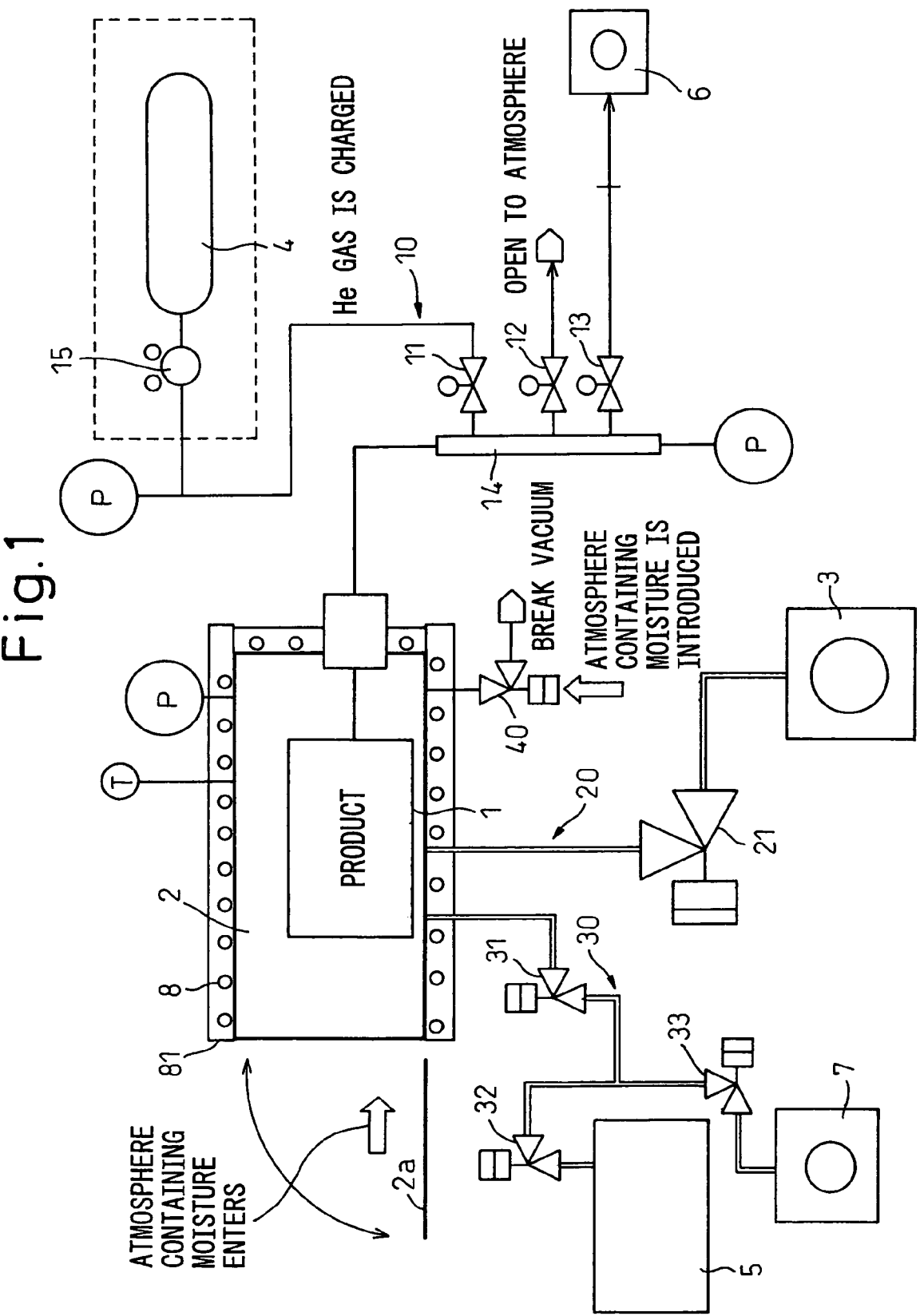
FIG. 1 is an overall arrangement view showing an outline of a leak inspection device of an embodiment of the present invention.

Referring to the drawings, a leak inspection device of an embodiment of the present invention will be explained below. FIG. 1 is an overall arrangement view showing an outline of the leak inspection device of the embodiment of the present invention. The leak inspection device basically includes: a vacuum chamber 2 for accommodating a product 1 which is an object to be inspected; a vacuum pump 3 for discharging air from the vacuum chamber 2; a helium bomb (gas cylinder) (He bomb) 4, which is a tracer gas supply source, for supplying a tracer gas such as helium gas (He gas) into the product 1; and a leak detector 5 for detecting He gas which has leaked out from the product 1.

The vacuum chamber 2 has a capacity in which the product 1, the size of which is variously changed, can be accommodated. On one side of the vacuum chamber 2, an opening and closing door 2a for taking in and out the product 1 is provided. On the outer walls of the vacuum chamber 2, a heater 8, which is a characteristic of the present invention, is provided The vacuum chamber 2 is mainly connected to three piping systems 10, 20, 30. In the vacuum chamber 8, the eighth valve 40 is provided, through which air is introduced into the vacuum chamber 2 after the completion of a leakage inspection so as to break a state of vacuum.

The heater 8 for heating the surface of the vacuum chamber 2 may be an electric heater in which resistance heating or induction heating is utilized. Alternatively, the heater 8 for heating the surface of the vacuum chamber 2 may be a hot water heater in which hot water is made to flow in a pipe or a hot air heater in which hot air is made to flow in a pipe. The heater 8 is covered with insulating material 81 so as to prevent a heat loss. According to an output from a temperature sensor T for detecting a temperature of the inner surface of the vacuum chamber 2, the heater 8 is controlled by a control means not shown so that the surface temperature can be maintained higher than the outside air temperature. It is preferable that the heater 8 is controlled so that the surface temperature can be maintained to be higher than the outside air temperature by 10° C. or more and to be not more than 60° C.

The first piping system 10 is a piping system for supplying He gas into the product 1 and for discharging He gas from the product 1 to the outside. That is, the first piping system 10 includes: He gas supply piping system in which He gas flows from He bomb 4 to the first valve 11 and enters the manifold 14 and is supplied to the product 1; a first discharge piping system which branches from the manifold 14 so that He gas can flow through the second valve 12 into the atmosphere; and a second discharge piping system which branches from the manifold 14 and connects with the discharging pump 6 through the third valve 13 so as to forcibly discharge He gas from the product 1. In this connection, a pressure sensor 15 is provided at an outlet of He bomb 4. Pressure gauges P for monitoring the inner pressure are respectively arranged in the He supply piping system, the manifold 14 and the vacuum chamber 2.

The second piping system 20 is a piping system for discharging air from the vacuum chamber 2 to the outside. Air flows from the vacuum chamber 2 through the fourth valve 21 and is forcibly discharged outside by the vacuum pump 3. In the vacuum chamber 2, the eighth valve 40 is provided, through which air is introduced into the vacuum chamber 2 so as to break a state of vacuum.

The third piping system 30 is an inspection piping system for inspecting He gas which has leaked out from the product 1 into the vacuum chamber 2. He gas, which has leaked out from the product 1, flows in the fifth valve 31 and the sixth valve 32 and is introduced into the leak detector 5. In the leak detector 5, a volume of He gas, which has leaked out, is measured. The third piping system 30 includes a sweep piping system for sweeping He gas when the piping system branches from between the fifth and the sixth valve 31, 32 and connects to the sweeping pump 7 through the seventh valve 33. This sweep piping system sweeps He gas which attaches to or stays in the third piping system 30.

In this connection, in FIG. 1, the fourth to the eighth valve 21, 31 to 33, 40 are respectively illustrated as an air cylinder operation type valve. However, it is also possible to employ an electromagnetic type valve.

Referring to the flow of operation shown in FIG. 2, operation of the leak inspection device of the present embodiment composed as described above will be explained below. First of all, the product 1, which is an object to be inspected, is put into the vacuum chamber 2, and the first piping system 10 is connected to the product 1. In this case, the heater 8 is previously operated, so that the temperature of the inner surface of the vacuum chamber 2 can be higher than the temperature of the outside air, for example, the temperature of the inner surface of the vacuum chamber 2 can be higher than the temperature of the outside air by 10° C. or more and the temperature of the inner surface of the vacuum chamber 2 can be not more than 60° C. Next, the fourth valve 21 of the second piping system 20 is opened and the vacuum pump 3 is driven so as to discharge the air from the vacuum chamber 2. In this connection, the fifth, sixth and seventh valves 31, 32, 33 in the third piping system 30 are closed. Further, the eighth valve 40 for breaking a state of vacuum is also closed. Substantially simultaneously when air is discharged from the vacuum chamber 2, the third valve 13 in the first piping system 10 is opened and the exhaust pump 6 is driven, so that air can be discharged from the product 1. At this time, of course, the first and second valves 11, 12 are closed.

Figure 2:
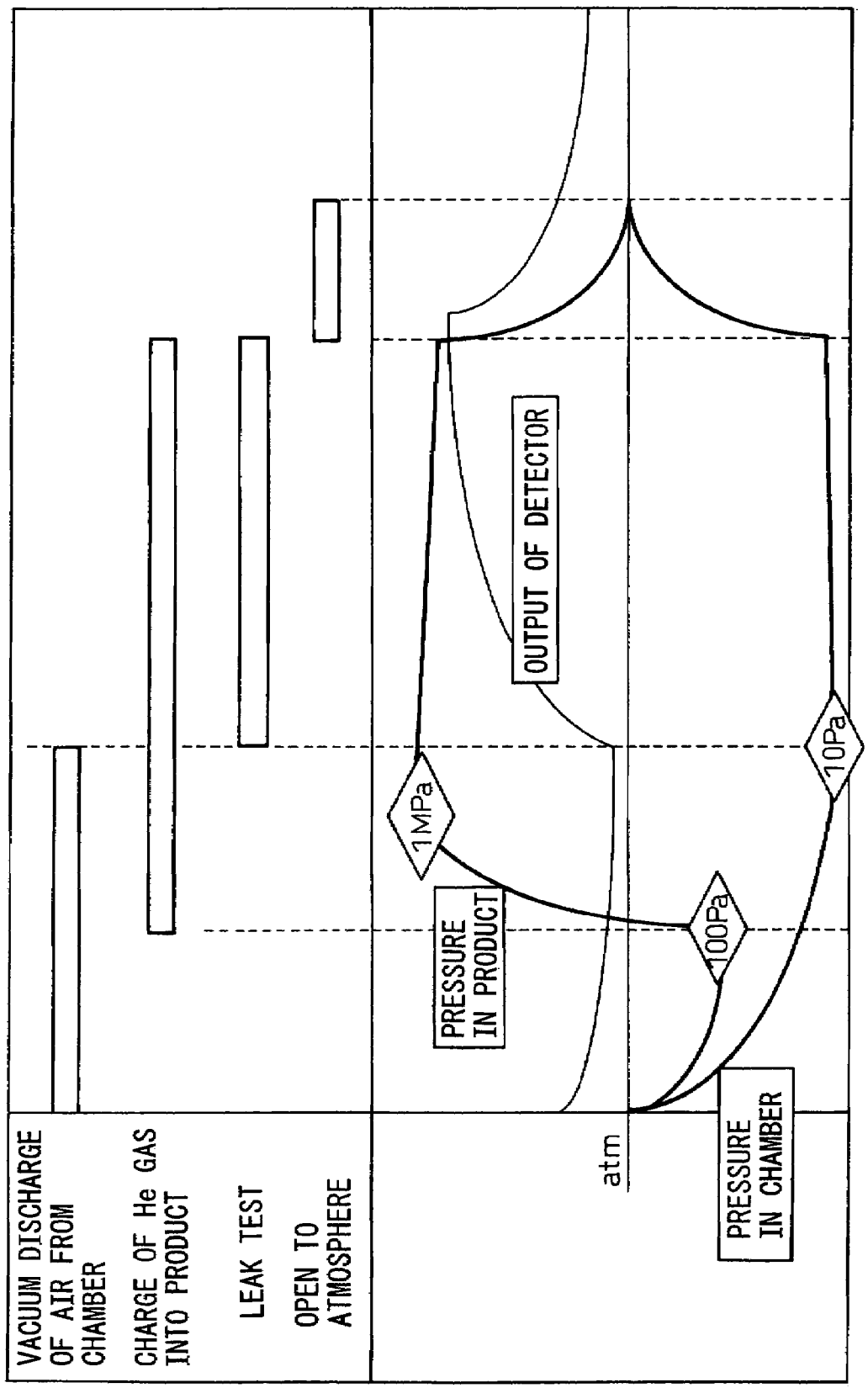
FIG. 2 is a view for explaining an inspection flow of the leak inspection device.

After air has been discharged from the vacuum chamber 2 and pressure in the vacuum chamber 2 is approximately reduced to 10 Pa as shown in FIG. 2, that is, after the vacuum chamber 2 has been put into a substantial vacuum state, operation of the vacuum pump 3 is stopped and the fourth valve 21 is closed at the same time. In the same manner, after air has been discharged from the product 1, operation of the exhaust pump 6 is stopped and the third valve 13 is closed.

Next, the first valve 11 in the first piping system 10 is opened and He gas is supplied from He bomb 4 into the product 1. After pressure in the product 1 has been substantially raised to 1 MPa as shown in FIG. 2, the first valve 11 is closed and the supply of He gas from He bomb 4 is stopped. At this time, of course, the second and third valves 12, 13 are closed. In this way, He gas, the pressure of which is approximately 1 MPa, is charged into the product 1.

After that, the fifth and sixth valves 31, 32 in the third piping system 30 are opened and the seventh valve 33 is closed. In this way, He gas, which has leaked out from the product 1 into the vacuum chamber 2, is introduced into the leak detector 5. In the leak detector 5, by utilizing the method of the mass spectrometry of helium, a volume of He gas, which has leaked out from the product 1 into the vacuum chamber 2, is measured. By the volume of He gas which has leaked out from the product 1 into the vacuum chamber 2 in a predetermined period of time, the quality of the product 1 is judged.

After the completion of the leakage inspection, the seventh valve 33 of the third piping system 30 is opened and the sweeping pump 7 is operated, so that He gas, which attaches to or stays in the third piping system 30, the leak detector 5 and the fifth, sixth and seventh valves 31, 32, 33, can be sucked and removed. Therefore, these components can be purified. At the same time, the eighth valve 40 is also opened and air is introduced into the vacuum chamber 2 so as to break the vacuum.

Further, the second valve 12 in the first piping system 10 is opened while the first and third valves 11, 13 are being closed. In this way, He gas is released from the product 1 into the atmosphere. Finally, the opening and closing door 2a of the vacuum chamber 2 is opened, and the product 1, the inspection of which has been completed, is disconnected from the first piping system 10 and removed from the vacuum chamber 2. In a series of steps described above, when the heater 8 is appropriately operated, the temperature of the inner surface of the vacuum chamber 2 can be maintained to be higher than the outside air temperature. Next, in the leak test of a product 1, the above steps are repeated.

Figure 3:
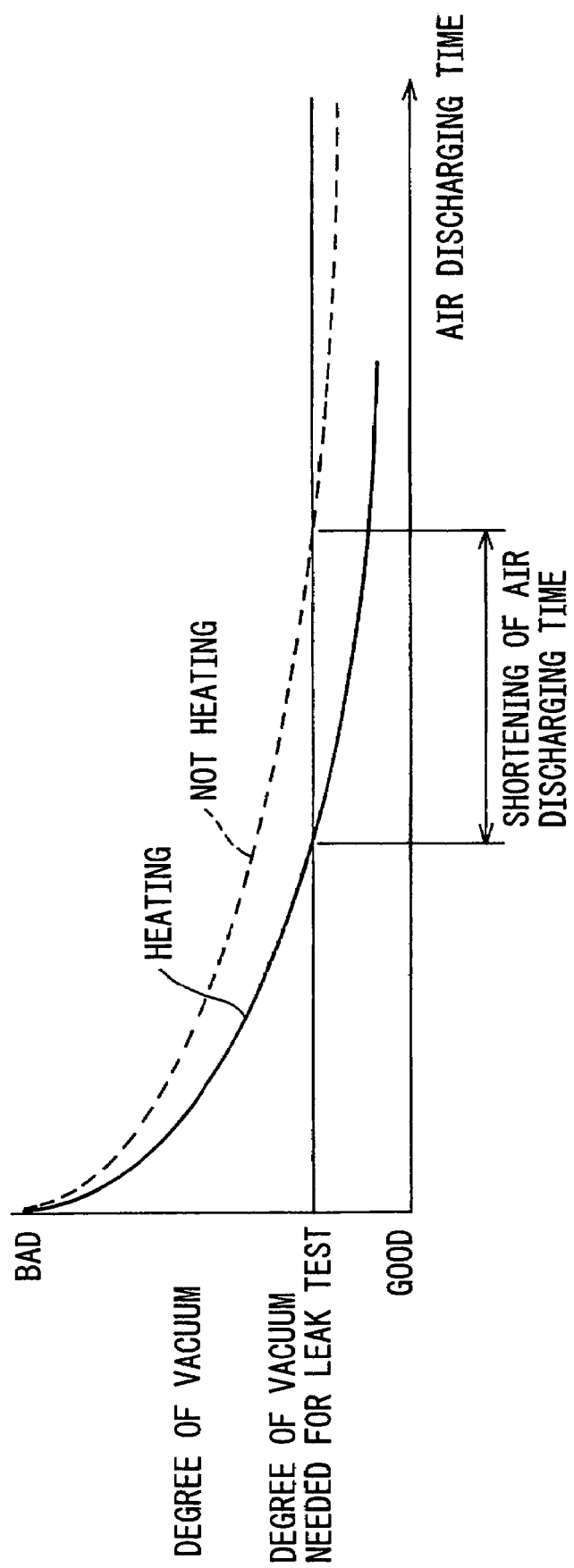
FIG. 3 is a graph in which the vacuum discharging time of the present invention and that of the prior art are compared with each other.
Figure 4:
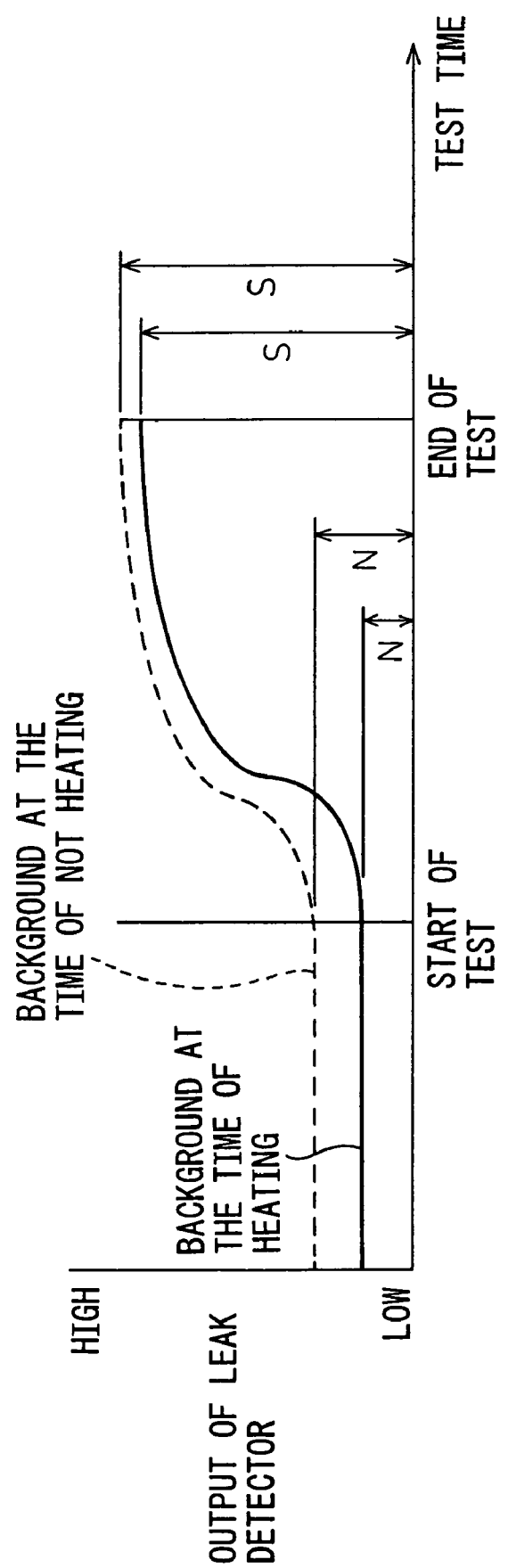
FIG. 4 is a graph in which the signal-to-noise ratio of the present invention and that of the prior art are compared with each other.

FIGS. 3 and 4 are graphs for explaining an operational effect of the present embodiment. FIG. 3 is a graph showing a comparison of the vacuum discharging time between a case in which the heater is provided and a case in which the heater is not provided. The axis of ordinates shows a degree of vacuum in the vacuum chamber 2 and the axis of abscissas shows a discharging time. In the graph, the solid line represents a case in which the vacuum chamber 2 has a heater 8 which is a structure of the present embodiment. The broken line represents a case in which the vacuum chamber 2 has no heater 8. As can be understood from FIG. 3, in the case of heating the vacuum chamber 3 with the heater 8, the degree of vacuum, which is needed for the leak inspection, can be attained relatively quickly. On the other hand, in the case of not heating the vacuum chamber 3, the degree of vacuum, which is needed for the leak inspection, is attained relatively slowly. As described above, according to the present embodiment, air can be discharged from the vacuum chamber with the vacuum pump 3 in a short period of time.

When the vacuum chamber 2, into which the product 1 is put, is heated, the water contained in the atmosphere can be prevented form attaching onto the inner surface of the vacuum chamber 2. Further, it is possible to prevent the temperature of the inner wall of the vacuum chamber 2 from being reduced by the adiabatic expansion effect caused by decompression. Accordingly, the vacuum discharging time for the next test can be shortened and stabilized.

When the temperature of the inner wall of the vacuum chamber is maintained at an appropriate value, the product can be heated by radiation. Therefore, it is possible to prevent a drop of the product temperature.

FIG. 4 is a graph showing a comparison of the background noise between a case in which the heater is provided and a case in which no heater is provided. The axis of ordinates represents an output of the leak detector and the axis of abscissas represents a test time. In the graph, the solid line represents a case in which the vacuum chamber 2 has a heater 8 which is a structure of the present embodiment. The broken line represents a case in which the conventional vacuum chamber 2 has no heater 8. As can be understood from FIG. 4, before the test is started, in the background which is an output of the leak detector in the case of heating the vacuum chamber, an intensity of noise (N) is very low. On the other hand, in the background which is an output of the leak detector in the case of not heating the vacuum chamber, the intensity of noise (N) is relatively high, that is, a difference between both of them is maximized. During the test, a difference in the output (signal: S) of the leak detector between both of them is gradually reduced. At the time of the end of the test, the difference between both of them is minimized. That is, it can be understood that the signal-to-noise ratio in the case of heating the vacuum chamber is higher than the signal-to-noise ratio in the case of not heating the vacuum chamber. From the above facts, it can be understood that the measurement accuracy is enhanced in the present embodiment.

As described above, in the present embodiment, when the vacuum chamber 2 is heated, the partial pressure of steam in the vacuum chamber is lowered. Due to the thus lowered partial pressure of steam, the background caused by the moisture can be reduced and the measurement sensitivity can be enhanced. Accordingly, it is possible to provide a remarkable operational effect in which the measurement accuracy is enhanced and the reliability of the inspection is also enhanced.

While the invention has been described by reference to specific embodiments chosen for the purpose of illustration, it should be apparent that numerous modifications could be made thereto by those skilled in the art without departing from the basic concept and scope of the invention.

The invention claimed is:

1. A leak inspection device comprising:
    a vacuum chamber for accommodating an object to be inspected;
    a vacuum pump for discharging air from the vacuum chamber;
    a tracer gas supply source for supplying and charging tracer gas into the object to be inspected; and
    a leak detector for detecting tracer gas which has leaked out from the object to be inspected, wherein
    a heater is provided on an outer wall of the vacuum chamber and an inner surface temperature of the vacuum chamber is maintained to be higher than the temperature of the outside air.

2. A leak inspection device according to claim 1, wherein the inner surface temperature of the vacuum chamber is maintained to be higher than the outside air temperature by 10° C. or more and to be not more than 60° C.

3. A leak inspection device according to claim 1, wherein the heater is covered with heat insulating material.

4. A leak inspection device according to claim 1, wherein the heater is an electric heater.

5. A leak inspection device according to claim 1, wherein the heater is a hot water heater or a hot air heater.

* * * * *